E. G. JOHANSON.
TRANSMISSION GEAR.
APPLICATION FILED MAY 4, 1920.

1,367,264.

Patented Feb. 1, 1921.

Emil G. Johanson
INVENTOR.

BY

ATTORNEYS.

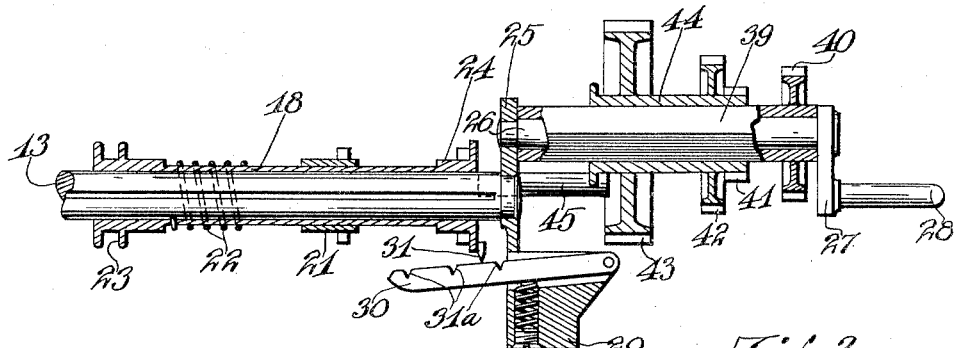
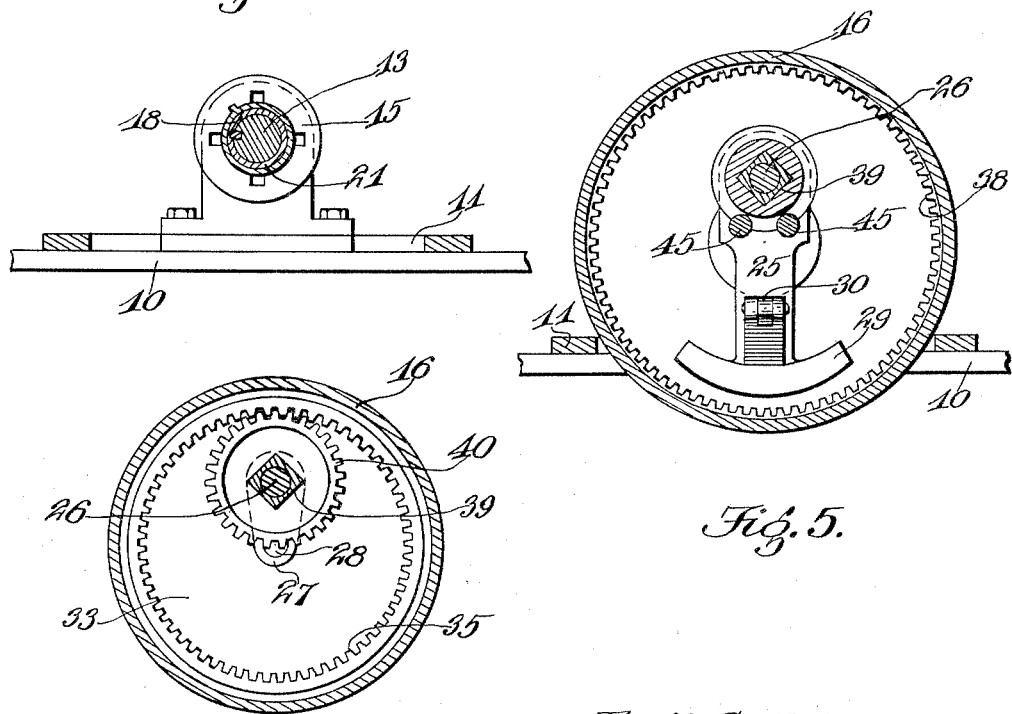

UNITED STATES PATENT OFFICE.

EMIL G. JOHANSON, OF CHICAGO, ILLINOIS.

TRANSMISSION-GEAR.

1,367,264.　　　　Specification of Letters Patent.　　Patented Feb. 1, 1921.

Application filed May 4, 1920. Serial No. 378,808.

*To all whom it may concern:*

Be it known that I, EMIL G. JOHANSON, a subject of the King of Sweden, residing at Chicago, in the county of Cook and State of Illinois, have invented new and useful Improvements in Transmission-Gears, of which the following is a specification.

This invention relates to gearing employed in connection with motor vehicles for transmitting the motion of the crank shaft at different rates of speed and also in a reverse direction, and more particularly a gearing for this purpose of the planetary type. It will be understood, however, that the gearing is not limited in its use in connection with motor vehicles, but that it may be employed with equal facility in connection with any machinery requiring a change speed and reverse drive.

The invention has for its object to provide a gearing of the kind stated which is highly efficient in operation, easily controlled, and devoid of complicated parts liable to get out of order.

A further object of the invention is to provide a planetary gearing giving three different speeds ahead and one reverse speed, and in which the shift from the intermediate speed to the high speed is effected without certain gears getting out of mesh.

Other objects and advantages of the invention will be pointed out in the detailed description appearing hereinafter, and in order that the invention may be better understood, reference is had to the accompanying drawings forming a part of this specification.

In the drawing,

Fig. 3 is an elevation showing the planetary pinion assembly and the parts associated therewith;

Fig. 4 is a cross-section on the line 4—4 of Fig. 1, and

Figure 1:
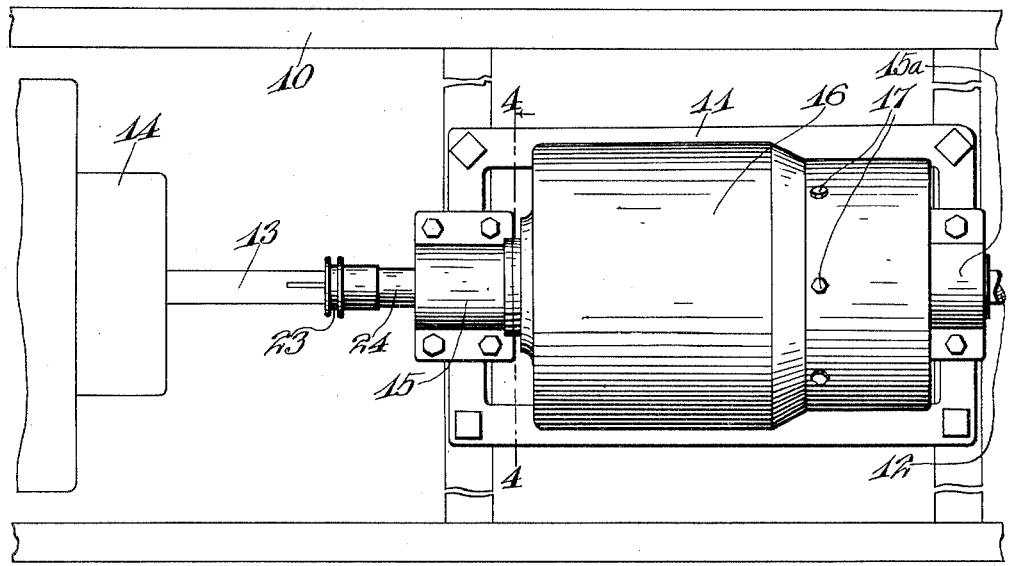
Figure 1 is a plan view of the mechanism.
Figure 2:
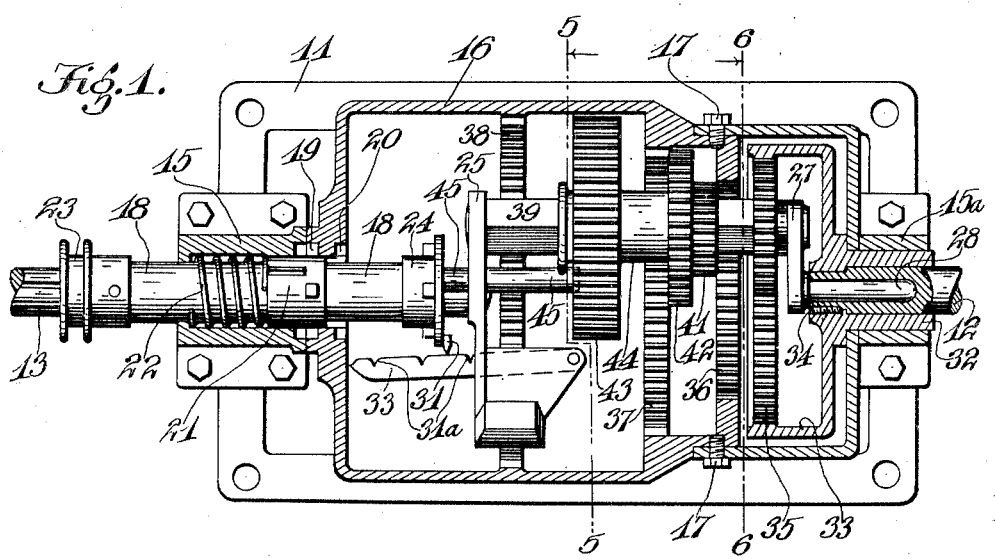
Fig. 2 is a horizontal section thereof.

Figs. 5 and 6 are cross sections on the lines 5—5 and 6—6, respectively, of Fig. 2.

Referring specifically to the drawings, 10 denotes a fragment of the chassis of a motor vehicle on which is mounted a base 11 which supports the transmission assembly. A fragment of the driven or propeller shaft is shown at 12, and the drive shaft therefor at 13, the latter shaft being connected to the engine crank shaft (not shown) by a suitable clutch 14.

On the base 11 are suitable bearings 15 and 15$^a$, respectively, between which is located a drum or housing 16 containing the transmission assembly. This drum is in two sections, detachably connected by tap bolts 17, or other suitable fastenings to permit assembly of the various elements.

One end of the drum 16 is entered by the drive shaft 13 and the other end by the driven shaft 12. On the end of the shaft 13 which enters the drum 16 is fitted a sleeve 18 which is splined or otherwise connected to said shaft so that it turns therewith and is also free to be slid thereon. The sleeve 18 enters the drum 16 through an opening in the end thereof and in this opening, on both sides of the drum end wall, are clutch teeth 19 and 20, respectively, which are for a purpose to be presently described.

The sleeve 18 passes through the bearing 15, and inside the latter the sleeve carries a clutch member 21 consisting of a collar having teeth at one end adapted to engage the outer clutch teeth 19 on the end wall of the drum 16. The clutch member 21 is free to slide on the sleeve 18, but it is prevented from turning by any suitable expedient, such as being splined in the bearing 15, and it is backed by a spring 22 tending to hold it normally advanced and interlocked with the clutch teeth 19.

On the outer end of the sleeve 18 is a circumferentially grooved head 23 for the application of a suitable shifter lever (not shown).

On the inner end of the sleeve 18, inside the drum 16, is fastened or made integral therewith, a clutch head 24 having teeth facing the inner clutch teeth 20 on the end wall of the drum, and adapted to engage the same. It will therefore be seen that when the sleeve 18 is retracted to engage the clutch head 24 with the teeth 20, the drum 16 is clutched to the sleeve 18, and as the latter turns with the shaft 13, the drum obtains motion from the latter at the same speed, this being the direct or high speed drive. However, before this drive can be obtained, the clutch member 21 must be disengaged from the drum 16, it being understood that the drum is locked when said clutch member engages the teeth 19 on the drum end wall. This disengagement of the clutch member 21 is effected by the clutch head 24, the latter being so spaced from the former that it is engaged by the clutch head 24 and backed out of engagement with the teeth 19 when said clutch head comes into interlocking engagement with the teeth 20.

On the inner end of the drive shaft 13, inside the drum 16, is a crank arm 25 extending from opposite sides thereof, and carrying on one side a crank pin 26 fitted at its outer end with another crank arm 27 carrying a stub shaft 28 which is in axial alinement with the shaft 13. These parts constitute a crank. The arm 25 on the side of the shaft 13 opposite the side where the crank pin 26 is located, carries a weight 29 to counter-balance the parts carried by the crank pin. The weight 29 carries a notched, spring-pressed latch bar 30, the notches of which are engageable by a tooth or lug 31 on the clutch head 24. The notches 31 are suitably spaced to correspond to the various positions to which the sleeve 18 is adapted to be shifted to obtain the different speeds, as well as the reverse drive, and in connection with the tooth 31 form stops to indicate to the operator when the proper position of the sleeve is reached. The latch bar 30 is free to yield and let the tooth 31 slip out of the notches when the sleeve 18 is shifted, and when a notch is reached sufficient resistance is offered to the further movement of the sleeve to indicate that the desired position of the sleeve has been reached. The spaces between the notches 31 conform to the neutral positions of the gearing.

In the bearing 15ª is journaled the hub 32 of a drum 33 positioned inside the drum 16 in concentric relation therewith. Into the hub 32 extends the driven shaft 12, the parts being fastened together by a key 34 or other suitable means.

The end of the stub shaft 28 is journaled in an axial opening in the driven shaft 12, and hence no motion is transmitted from the stub shaft to the driven shaft.

The drum 33 has an internal gear 35 and therefore serves as a carrier for said gear. The drum 16 has internal gears 36, 37 and 38, respectively, and serves as a carrier for these gears.

On the crank pin 26 is loosely mounted a sleeve 39 the external contour of which is squared so that certain pinions mounted on said sleeve are prevented from rotating on the sleeve but are made to rotate with the sleeve, the latter, in turn, being rotatable on the crank pin.

Positioned on the sleeve 39 so as to be in mesh at all times with the gear 35, is a pinion 40, and slidably mounted on the sleeve is an assembly of three pinions 41, 42 and 43, respectively having a common hub 44 so as to turn as one. The pinion 41 is adapted to be brought into mesh with the gear 36, the pinion 42 with the gear 37, and the pinion 43 with gear 38. The relative diameters of the three pinions is such that the pinion 41 gives the reverse drive, the pinion 42 the low speed, and the pinion 43 the intermediate speed, when said pinions are in mesh with their respective gears on the drum.

The assembly of pinions 41, 42 and 43 is shiftable on the sleeve 39 by rods 45 carried by the clutch head 24 of the slidable sleeve 18, and hooked over an outstanding circumferential flange on the sleeve 39. Thus, when the sleeve 18 is slid, the pinions 41, 42 and 43 are shifted. The rods 45 pass through apertures in the crank arm 25.

The supporting drum or carrier 16 for the gears 36, 37 and 38 is supported at one end on the hub 32 of drum 33, and at the other end by the sleeve 18 through the clutch members 21 and 24 alternately.

The operation of the mechanism may be summarized as follows:

Fig. 2 shows the gears in neutral position. To obtain the low speed drive, the assembly of pinions 41, 42 and 43 is shifted to the left to bring the pinion 42 in mesh with the gear 37. The drum 16 is held stationary by the clutch member 21. The pinions 41 and 43 are out of mesh with their respective drum gears, but the pinion 40 is in mesh with the gear 35. The motion of the shaft 13 revolves the crank-like support of pinion 42 so that the latter rolls around the gear 37, and rotates the sleeve 39 carrying pinion 40, and that the latter rolls around the gear 35, but as the carrier 33 of said gear is not locked but is fastened to the driven shaft 12, said carrier is rotated by the gear 35 and the shaft 12 turns with the carrier, but at a speed less than that of the drive shaft 13.

The intermediate speed is obtained by bringing the pinion 43 in mesh with the gear 38 which disengages the pinion 42 from the gear 37. The action is now the same as before, except that the shaft 32 is driven at a greater speed, but still at a speed less than that of the drive shaft 13.

To obtain the reverse drive, the pinion 41 is brought into mesh with the gear 36, whereupon the shaft 12 is driven in a direction opposite to that of the shaft 13, due to the fact that the reverse pinion 41 is smaller in diameter than that of the constantly meshing pinion 40. The reverse drive is not obtained when the pinions 42 and 43 are in mesh as the diameters of these pinions is greater than that of the pinion 40.

To obtain the high speed, direct drive, the sleeve 18 is shifted to the left until the clutch head 24 engages the drum teeth 20 and locks the drum 16 to the sleeve 18 so that the drum now turns with the drive shaft 13. As pointed out hereinbefore, the engagement of the clutch head 24 with the teeth 20 also disengages the clutch member 21 to free the drum. The drum 16 and the entire assembly of gears and other parts carried thereby including the drum 33 now turn as one and the motion of the drum 33 is transmitted to the shaft 12 as it is made fast thereto.

It will be noted that the pinion 43 is much wider than the intermediate speed gear 38, so that when the shift is made from intermediate speed to high speed said pinion remains in mesh with said gear.

I claim:

1. A planetary gearing comprising a plurality of internal gears of different diameters, a carrier for said gears, axially alined drive and driven shafts, the drive shaft having a crank and being journaled at its inner end in the corresponding end of the driven shaft, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, and means for coupling said carrier directly to the drive shaft.

2. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, and means for coupling said carrier directly to the drive shaft.

3. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last mentioned gear coupled to the driven shaft, means for holding the first-mentioned carrier stationary relative to the drive shaft, means for coupling said carrier directly to the drive shaft, and actuating means for said coupling means having means for shifting the aforesaid assembly of planetary pinions.

4. A planetary gearing comprising a plurality of internal gears of different diameters, a carrier for said gears, axially alined drive and driven shafts, the drive shaft having a counterbalanced crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, and means for coupling said carrier directly to the drive shaft.

5. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, means for coupling said carrier directly to the drive shaft, and a sleeve rotatable with and slidable on the drive shaft, said sleeve carrying the aforesaid coupling means.

6. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, means for coupling said carrier directly to the drive shaft, and a sleeve rotatable with and slidable on the drive shaft, said sleeve carrying the aforesaid coupling means, and having means for shifting the aforesaid assembly of planetary pinions.

7. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, means for holding the first-mentioned carrier stationary relative to the drive shaft, and means for coupling said carrier directly to the drive shaft, said coupling means also operating to release the first mentioned carrier.

8. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, a slidable and nonrotatable clutch member for holding the first-mentioned carrier stationary relative to the drive shaft, a sleeve slidable on the drive shaft and rotatable therewith, said sleeve supporting the clutch member, and a clutch member carried by the sleeve and engageable with the first mentioned carrier for locking the same to the sleeve.

9. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, a slidable and nonrotatable clutch member for holding the first mentioned carrier stationary relative to the drive shaft, a sleeve slidable on the drive shaft and rotatable therewith, said sleeve supporting the clutch member, and a clutch member carried by the sleeve and engageable with the first mentioned carrier for locking the same to the sleeve, said second-mentioned clutch member being also engageable with the first-mentioned clutch member to disengage the same from the carrier.

10. A planetary gearing comprising a plurality of internal gears, of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last mentioned gear coupled to the driven shaft, a slidable and nonrotatable clutch member for holding the first-mentioned carrier stationary relative to the drive shaft, a sleeve slidable on the drive shaft and rotatable therewith, said sleeve supporting the clutch member, a clutch member carried by the sleeve and engageable with the first-mentioned carrier for locking the same to the sleeve, and an operative connection between the sleeve and the aforesaid assembly of planetary gears for shifting the same.

11. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, a carrier for the last-mentioned gear coupled to the driven shaft, a slidable and nonrotatable clutch member for holding the first-mentioned carrier stationary relative to the drive shaft, a sleeve slidable on the drive shaft and rotatable therewith, said sleeve supporting the clutch member, a clutch member carried by the sleeve and engageable with the first mentioned carrier for locking the same to the sleeve, said second-mentioned clutch member being also engageable with the first-mentioned clutch member to disengage the same from the carrier, and an operative connection between the sleeve and the aforesaid assembly of planetary gears for shifting the same.

12. A planetary gearing comprising a plurality of internal gears of different diameters, a carrier for said gears, axially alined drive and driven shafts, the drive shaft having a crank, an assembly of planetary pinions carried by the crank and shiftable for selective engagement with the aforesaid gears, another planetary pinion carried by the crank, an internal gear with which the last-mentioned pinion is constantly in mesh, the relative diameters of the pinions of the aforesaid assembly of planetary pinions varying, and the diameter of one of said pinions being less than that of the last mentioned constantly meshing pinion, a carrier for the last-mentioned gear coupled to the driven shaft, means for holding the first-mentioned carrier stationary relative to the drive shaft, and means for coupling said carrier directly to the drive shaft.

13. A planetary gearing comprising a plurality of internal gears of different diameters, a carrier for said gears, axially alined drive and driven shafts, the drive shaft having a crank, an assembly for planetary pinions carried by the crank and shiftable for selective engagement with the aforesaid gears, another planetary pinion carried by the crank, an internal gear with which the last-mentioned pinion is constantly in mesh, the relative diameters of the pinions of the aforesaid assembly of planetary pinions varying, and the diameter of one of said pinions being less than that of the last mentioned constantly meshing pinion, and the diameters of the other ones of said planetary pinions being greater than that of the constantly meshing pinion, a carrier for the last mentioned gear coupled to the driven shaft, means for holding the first mentioned carrier stationary relative to the drive shaft, and means for coupling said carrier directly to the drive shaft.

14. A planetary gearing comprising a plurality of internal gears of different diameters, a carrier for said gears, axially alined drive and driven shafts, the drive shaft having a crank, an assembly for planetary pinions carried by the crank and shiftable for selective engagement with the aforesaid gears, another planetary pinion carried by the crank, an internal gear with which the last-mentioned pinion is constantly in mesh, the relative diameters of the pinions of the aforesaid assembly of planetary pinions varying, and the diameter of one of said pinions being less than that of the last-mentioned constantly meshing pinion, a carrier for the last-mentioned gear coupled to the driven shaft, means for holding the first mentioned carrier stationary relative to the drive shaft, and means for coupling said carrier directly to the drive shaft, the width of one of the pinions of the assembly of planetary pinions being greater than that of the internal gear with which it is adapted to mesh, to remain in mesh when the carrier is coupled directly to the drive shaft.

In testimony whereof I affix my signature.

EMIL G. JOHANSON.